United States Patent [19]

Mori et al.

[11] 4,219,584
[45] Aug. 26, 1980

[54] HARD BUTTER COMPOSITION

[75] Inventors: Hiroyuki Mori, Yokohama; Yukiya Iwanaga; Kazuo Akamatsu, both of Osaka; Hayato Kubota, Izumi, all of Japan

[73] Assignee: Fuji Oil Company, Limited, Osaka, Japan

[21] Appl. No.: 939,797

[22] Filed: Sep. 5, 1978

[30] Foreign Application Priority Data

Sep. 8, 1977 [JP] Japan ................................. 52-108455

[51] Int. Cl.² ............................................... A23D 5/00
[52] U.S. Cl. ................................................... 426/607
[58] Field of Search ............................................ 426/607

[56] References Cited

U.S. PATENT DOCUMENTS

| | | | |
|---|---|---|---|
| 2,975,060 | 3/1961 | Best et al. | 426/607 |
| 2,975,063 | 3/1961 | Paul et al. | 426/607 |
| 3,012,891 | 12/1961 | Best et al. | 426/607 |
| 3,070,445 | 12/1962 | Sinnema | 426/607 |
| 3,171,748 | 3/1965 | Galenkamp | 426/607 |
| 4,103,039 | 7/1978 | Mandai et al. | 426/607 |

*Primary Examiner*—Robert A. Yoncoskie
*Attorney, Agent, or Firm*—Birch, Stewart, Kolasch and Birch

[57] ABSTRACT

A hard butter composition useful as a cacoa butter substitute comprising an intermediate fraction of palm oil and a solid fat fraction of shea fat, the total content of 2-oleo-1,3-distearin and 2-oleo-palmito-stearin in said shea fat fraction being lower than 80% by weight, wherein an intermediate fraction of palm oil having a slip melting point of 29.0°–32.5° C. and a clear point of not more than 34° C. is utilized, whereby the shea fat fraction is not required to be specifically purified.

3 Claims, No Drawings

HARD BUTTER COMPOSITION

The present invention relates to a hard butter composition. More particularly, the hard butter composition of the present invention is useful as a cacao butter substitute which can be admixed with cacao butter in any mixing ratio.

Cacao butter is an important ingredient of chocolate and there have been many attempts to substitute a hard butter or a composition thereof for cacao butter.

In one attempt, an intermediate fraction of palm oil (hereinafter referred to as PMF) is used as a cacao butter substitute. Palm oil is extracted from palm nuts, which are cultivated in Southeast Asia, Central Africa and other places, and is an important source of oils and fats. Its yield is expected to be further increased in future. Moreover, palm oil contains as principal components thereof up to about 30% of 2-oleo-1,3-dipalmitin (hereinafter referred to as POP) and a small amount of 2-oleo-palmito-stearin (hereinafter referred to as POS). Physical and chemical properties of POP are similar to those of principal components of cacao butter which are POS and 2-oleo-1,3-distearin (hereinafter referred to as SOS). Thus, PMF is rich in POP and POS components and is used as a cacao butter substitute (for example, see British Patent Specification No. 827,172). However, PMF has usually been admixed with cacao butter in only a small ratio of up to 5% based on the weight of cacao butter because PMF has a relatively low melting point and, therefore incorporation of a large amount of PMF thereto induces a lowering of the temperature resistance and snapping properties at high temperature of the product.

In another attempt, a mixture of PMF and a solid fat fraction of shea fat (hereinafter referred to as SNF) is used as a cacao butter substitute. Shea fat is extracted from shea nuts which grow wild in Central Africa. Shea fat is rich in the SOS component, and SNF obtained therefrom has a relatively high melting point. Therefore, when SNF is admixed with cacao butter, the physical properties of the resulting butter shows little deterioration. However, since SOS component has a much higher melting point (44°–44.5° C.), if a large amount of SOS component is presented in the fat materials of the chocolate, the melting properties in the mouth of the product are remarkably debased. Therefore, it has been proposed to use as a cacao butter substitute a mixture of PMF which has a lower melting point than that of cacao butter and SNF which has, on the contrary, a higher melting point than that of cacao butter, said mixture having a suitable melting point (see British Pat. No. Specification No. 925,805).

Although this latter attempt is successful to some extent, it has been pointed out that the viscosity of the raw materials in the tempering step of chocolate-making increases much higher than usual if a large amount of a mixture of PMF and SNF (generally, more than 30%) is used as a cacao butter substitute. As is generally known, in a tempering step, molten raw materials are cooled to a certain temperature and then they are again warmed so as to accelerate the crystal form-transition of fat ingredients therein. The viscosity increases during these cooling and warming processes. When the viscosity is so high, it makes difficult not only the kneading operation in the tempering step, but also the separation of the product from a shaping mold in a molding step of chocolate-making because of the insufficient crystal form-transition of the fat ingredients. The reason for this problem has not been made clear but it is assumed to be due to the impurities in SNF. It has been also proposed to use as a cacao butter substitute a mixture of a further purified SNF containing more than 85% of SOS component and usual PMF (British Patent Specification No. 1,390,936). However, there are still some defects in the use of the purified SNF. For example, the purification of SNF is not economical in view of the shea fat source (unlike palm nuts, shea nuts are not cultivated). Further, a hard butter containing the purified SNF cannot be admixed with cacao butter in a high mixing ratio since the melting point of chocolate obtained tends to be higher if the content of the SOS component therein becomes higher.

As the result of extensive studies, it has now been found that a hard butter composition prepared by admixing PMF having specific characteristics with usual SNF is useful for a cacao butter substitute and can be admixed with cacao butter in a high mixing ratio.

An object of the present invention is to provide an improved hard butter composition useful as a cacao butter substitute.

Another object of the present invention is to provide a cacao butter substitute which can be admixed with cacao butter in a high mixing ratio without any deterioration of the properties thereof.

A further object of the present invention is to provide a cacao butter substitute having no economic problems such as the purification of SNF.

These and other objects and advantages of the present invention will be apparent from the following description.

To accomplish the above objects, according to the present invention, there is provided a hard butter composition which comprises PMF having a slip melting point (hereinafter referred to as SP) of 29.0°–32.5° C. and a clear point (hereinafter referred to as CP) of not more than 34° C. and usual SNF (i.e. the total content of SOS and POS components in SNF is lower than 80% by weight). The hard butter composition of the present invention can be admixed with cacao butter in a high mixing ratio without any undesirable effect such as lowering working properties in a tempering step and provides superior snapping properties to the final product. Moreover, there is no need to use the purified SNF as described above.

The terms "SP or slip melting point" and "CP or clear point" used herein have the following meanings, respectively:

SP or slip melting point

This represents a kind of melting point of PMF and is determined as follows:

(1) Apparatus

SP is determined by using the same apparatus as described in ASTM Designation: D 36-26, "Standard Method of Test for SOFTENING POINT OF BITUMINOUS MATERIALS" (ASTM STANDARD, pp. 1030–32 (1958) provided that the inside wall of the ring to be used is tapered, the upper inside diameter of the ring is 17.5–18.0 mm and the lower inside diameter thereof is 15.5–16.0 mm and the ball to be used is 10.50–10.55 mm in diameter (weighing 3.50–3.55 g).

(2) Preparation of sample

A molten sample is poured into the ring placed on a plane board which has been previously cooled and is solidified by cooling at 0° C. for 60 min. The solidified sample is maintained at 23° C. for 7 days (aging).

(3) Determination

The sample is set on the apparatus as described in the above ASTM Designation. According to the conditions described in A.O.C.S. Official Method Cc 3-25, "Softening Point," the temperature at which the ball placed in the center of the upper surface of the sample in the ring slips off through the ring is determined. This is SP or slip melting point.

CP or clear point (1) Preparation of sample

About 20 g of a sample is completely molten and impurities are removed by using filter paper (Toyo Roshi No. 2) to give a clear sample solution. 10±1 g of the solution is weighed into a test tube having 16 mm of inner diameter, 18 mm of outer diameter and 100 mm of length and immediately stored in a freezer (about −15° C.) precisely for 30 min. to solidify the solution.

(2) Determination

CP represents the lowest temperature at which the sample can be kept clear. In the present invention, CP should be not more than 34° C. In practice, the CP is measured as follows:

The tube containing the solidified sample is dipped into a water bath kept at a constant temperature of 34° C. or more (accuracy ±0.2° C.) so that the surface of the sample is disposed below the surface of the water in the bath and is maintained in this position for 60 min. After 60 min., clarity of the sample is observed. When all the portions of the sample are clarified at the temperature, the determination is repeated at a lower temperature.

It has been found that PMF having SP of 29.0°–32.5° C., and CP of not more than 34° C. can be used to obtain a hard butter composition having superior properties without using the above purified SNF. When SP is lower than 29.0° C., the hardness of the chocolate obtained is lowered and the snapping properties at high temperatures thereof deteriorate. On the other hand, when SP is higher than 32.5° C., the viscosity in the tempering step increases so high that the working properties deteriorate. Regarding CP, when CP is higher than 34° C., it also causes a deterioration of the working properties in the tempering step.

PMF having these characteristics is obtained from palm oil by removing both the higher melting point fraction and the lower melting point fraction therefrom according to a known solvent fractionation, but it needs somewhat more precise operations.

According to our experience, it seems that it is best to first remove the lower melting point fraction amounting to more than 30% by weight of palm oil and then to remove the higher melting point fraction from the remaining palm oil in view of the yield and quality of the product and the working properties thereof. In order to remove the lower melting point fraction, it is preferable to use a solvent in an amount of 2.5 to 6 times by volume to the volume of the palm oil to be treated. The temperature of fractionation depends on the specific solvent to be used. For example, a range of −10° to −17° C. is preferable in the case of using n-hexane as a solvent. When using methyl ethyl ketone (MEK) as a solvent, a range of 0°−−5° C. is preferable. In order to remove the higher melting point fraction, the solvent may be used in the same amount as that in the removal of the lower melting point fraction, and it is preferable to fractionate at a higher temperature, such as 2° to −4° C. in case of using n-hexane and 15°–20° C. in case of using MEK. The PMF thus obtained occasionally contains impurities having a lower melting point. Accordingly, it is preferable to remove the impurities therefrom. The removal of impurities is preferably carried out by the same procedure as in the above removal of the lower melting point fraction in a fat concentration of 11–17%. When using acetone as a solvent, a slightly higher temperature than that in using MEK should be employed. In any event, in practice, one skilled in the art should determine the best conditions for fractionation on the basis of his experiences, taking into account various factors such as kind of solvent to be used, concentration of fat in the solvent, cooling rate, variation of quality caused by lot-to-lot variation of palm oil or the like. The principle of solvent fractionation is based on the fact that the solubility of each glyceride component of oils and fats in a solvent at a certain temperature is different from each other according to the melting point thereof.

SNF used in the hard butter composition of the present invention may be obtained from shea fat by a conventional method and does not need to have a particular high content of SOS. Generally, it is preferable that SNF contains about 50–80% of SOS ("SOS" refers to the generic expression 2-unsaturated-1,3-di-saturated glycerides including SOS and other compounds such as POS and POP).

In the hard butter composition of the present invention, SNF and PMF are preferably mixed in a weight ratio of 25–75:75–25 (total 100). The hard butter composition of the present invention can be admixed with cacao butter in any mixing ratio. Preferably, the weight ratio of cacao butter to the hard butter composition is 70–30:30–70. When the above ratio of SNF and PMF is lower than 1:3, it is difficult to admix a large amount of the hard butter composition with cacao butter since the temperature resistance of chocolate obtained is lowered, even if the increase of the viscosity in the tempering step may be inhibited thereby. On the other hand, when the above ratio is higher than 3:1, the amount of the hard butter composition which can be admixed with cacao butter is also limited since it is not only economically disadvantageous but also makes working properties in a tempering step worse and raises the melting point of the chocolate formulations. However, the above ratio merely illustrates a standard and is not critical since the viscosity of the chocolate formulations in chocolate-making is varied according to the amount of other ingredients such as bitter chocolate, whole milk powder, powdered sugar, lecithin or the like. However, the most preferable ratio of PMF:SNF is 30:70—70:30. Particularly, the hard butter composition within the latter range can be admixed with cacao butter in any ratio without the extreme high viscosity in the tempering step. Moreover, chocolate obtained therefrom has a superior temperature resistance and snapping properties at high temperature.

The hard butter composition of the present invention can be prepared by mixing PMF having the above characteristics and SNF according to a known technique and may contain a small amount of another ingredient such as illipe butter, sal fat (Shorea Robusta), kokum butter, Borneo tallow or the like. The hard butter composition of the present invention can be admixed with cacao butter in the same manner as a known cacao butter substitute.

The following examples illustrate the present invention but are not to be construed as limiting the scope thereof. In the following examples, the tempering test is carried out as follows:

According to a standard method, a sample of chocolate formulations is cooled and, firstly, the viscosity at 30° C. is measured. The sample is further cooled to the predetermined temperature and then the temperature is elevated. Secondly, the maximum viscosity which is reached during this warming step is measured. The difference between the above two values of the viscosity is "viscosity variation" and the difficulty of the tempering operation corresponds to the degree of the viscosity variation. The viscosity is recorded as the value of torque applied to the stirring shaft of the tempering apparatus and the viscosity variation is shown by the difference between the values of torque (Torque increase). Difficulty of the tempering operation is evaluated as follows:

| Torque increase | Difficulty of tempering |
| --- | --- |
| 0–<0.7 kg cm | easy |
| 0.7–<1.0 kg cm | relatively easy |
| 1.0–<1.3 kg cm | relatively difficult |
| more than 1.3 kg cm | very difficult |

In the examples, "part" and "%" are shown by weight, unless specified otherwise.

Preparation 1

Preparation of PMF

One part of refined and bleached palm oil (I.V.: 53.2) is dissolved in 4 parts of n-hexane with warming. The solution is stirred at −20° C. for 1 hour and the solid thus formed is removed by filtration to separate a lower melting point fraction (hereinafter referred to as PLF). To the solid is added fresh n-hexane to give a mixture containing 20% of fat. The mixture is warmed to 30° C. to form a solution and then the solution is cooled to 1° C. and stirred for 30–40 min. to form a solid. The solid is collected by filtration and washed with 0.3 part of n-hexane (previously cooled to −5° C.). The solid thus obtained is a higher melting point fraction of palm oil (hereinafter referred to as PHF). The washings are combined with the above mother liquor from which PHF is filtered and is stirred at −13° C. for 30–40 min. to form a solid. The solid is collected by filtration and washed with 1 part of n-hexane (−20° C.) to give the desired PMF. The fraction which is dissolved in the washings and the mother liquor is a lower melting point fraction (PLF'). The solvent is removed from each fraction by distillation to give the following component:

|  | PHF | PMF* | PLF | PLF' |
| --- | --- | --- | --- | --- |
| Yield (%) | 12.4 | 24.5 | 37.5 | 25.6 |
| I.V. | 14.4 | 33.1 | 70.4 | 62.0 |
| SP (°C.) | — | 31.9 | — | — |
| CP (°C.) | — | 34≧ | — | — |

(Note):
*Solid fat content in PMF is as follows:
10° C.: 78.3%; 25° C.: 70.5%; 35° C.: 0.5%

Preparation 2

Preparation of SNF

Degummed shea fat is prepared according to the method described in Japanese Patent Publication (not examined) No. 51-91907. That is, to one part of refined shea fat (Acid Value: 2.2, I.V.: 61.5, S.V.: 176.6) is added 4 parts of 7% aqueous ethanol and the mixture is heated with stirring at 110° C. under pressure. The mixture is allowed to stand at the same temperature for 15 min. and then the ethanol insoluble lower layer is removed (yield: 5.1%, I.V.: 205.3). After removing the lower layer, the upper layer (supernatant liquid) is cooled to 40° C. and allowed to stand at the same temperature for 30 min. This lower layer is collected and the solvent is removed to give degummed shea fat (yield: 75.2%, I.V.: 54.5). To one part of the degummed shea fat is added 4 parts of n-hexane and cooled at −25° C. for 90 min. to form a solid. The solid is collected by filtration, washed with 0.5 part of n-hexane (−30° C.) and removed the solvent to give the desired SNF (yield: 62.5%, I.V.: 43.1, SOS content: 68%). The solvent is removed from the mother liquor to recover a liquid fraction (yield: 37.5%, I.V.: 73.7).

EXAMPLE 1

Several chocolate samples (71.4% of cacao butter was substituted by a hard butter composition) were prepared from the chocolate formulations consisting of 15.6% of bitter chocolate, 19.8% of whole milk powder, 44.2% of powdered sugar, 0.7% of lecithin and 19.7% of each hard butter composition listed in the following Table 1 by carrying out conching and tempering according to a standard method.

The increase of the viscosity of each sample thus obtained is shown in Table 1, from which it is clear that the increase of the viscosity of Samples 1 and 5 which are prepared by using the hard butter composition of the present invention is smaller than that of the others.

Table 1

| Sample | PMF CP* (34° C.) | PMF SP (°C.) | PMF Parts | SNF SOS (%) | SNF Parts | Increase of viscosity (kg cm)** |
| --- | --- | --- | --- | --- | --- | --- |
| 1 | — | 30.9 | 65 | 75 | 35 | 0.5 |
| 2 | ∓ | 31.9 | 65 | 75 | 35 | 1.1 |
| 3 | ± | 32.4 | 65 | 75 | 35 | 1.3 |
| 4 | + | 32.8 | 65 | 75 | 35 | 1.5 |
| 5 | — | 31.9 | 65 | 75 | 35 | 0.7 |
| 6*** | + | 32.9 | 65 | 75 | 35 | 1.2 |

[Note]:
*The definition of CP representation is as follows:
—: Completely clear (acceptable)
∓: Slightly cloudy (unacceptable)
±: Both a clear zone and a cloudy zone are observed (unacceptable) and
+: Overall cloudy (unacceptable).
**: More than 1 kg cm of Torque increase is judged to be unacceptable.
***: Corresponding to the product of Example 2 in British Patent Specification No. 827,172.

EXAMPLE 2

According to the same procedure of Example 1, a chocolate sample (35.7% of cacao butter was substituted by a hard butter composition) was prepared from the formulations consisting of 9.9% of bitter chocolate, 24.8% of whole milk powder, 41.8% of powdered sugar, 9.9% of the hard butter composition shown in the following Table 2, 12.9% of cacao butter and 0.7% of lecithin. Separately, as a control, the other sample (Sample 8) was prepared from the same formulations except that the hard butter composition was wholly substituted by cacao butter.

Results obtained from the comparison of these two samples are shown in Table 2. As is shown therein, Sample 7 prepared by using the hard butter composition of the present invention shows the same small increase of the viscosity as that of Sample 8 prepared by using only cacao butter.

Table 2

| Sample | PMF CP (34° C.) | PMF SP (°C.) | PMF Parts | SNF SOS (%) | SNF Parts | Increase of viscosity (kg cm) |
|---|---|---|---|---|---|---|
| 7 | — | 32.1 | 55 | 75 | 45 | 0.3 |
| 8 | | | | | | 0.3 |

EXAMPLE 3

According to a standard method, two chocolate samples (light sweet type) were prepared from the formulations consisting of 4.0 parts of bitter chocolate, 2.0 parts of cacao powder, 6.1 parts of cacao butter, 52.18 parts of powdered sugar, 19.95 parts of the hard butter composition listed in the following Table 3, 0.39 parts of flavor and 15.01 parts of whole milk powder. Each increase of the viscosity of these samples is shown in Table 3.

Table 3

| Sample | PMF CP (34° C.) | PMF SP (°C.) | PMF Parts | SNF SOS (%) | SNF Parts | Increase of viscosity (kg cm) |
|---|---|---|---|---|---|---|
| 9 | — | 32.1 | 60 | 70 | 40 | 0.4 |
| 10* | + | 32.9 | 60 | 70 | 40 | 1.1 |

[Note]:
*Corresponding to the product of Example 2 in British Patent Specification No. 827,172.

EXAMPLE 4

The following test was carried out using 9 chocolate samples so as to investigate the effect of SP and CP or PMF used, kind of SNF and the mixing ratio thereof on working properties in chocolate-making and the quality of the chocolate obtained therefrom.

| Formulation of chocolate | |
|---|---|
| Cacao mass (cacao butter content: 50%) | 15% |
| Whole milk powder | 20% |
| Powdered sugar | 44.5% |
| PMF + SNF (hard butter composition: 71.4% of cacao butter is substituted by the composition.) | 19.8% |
| Lecithin | 0.7% |

Test Method for Hardness of Chocolate

A chocolate sample was allowed to stand at 18°–20° C. for more than 10 days so as to stabilize the crystal form of fat therein. After stabilization, the chocolate was kept in a thermostatic chamber maintained at a predetermined temperature for more than 6 hours. The sample was taken out from the chamber and was immediately snapped by hands. Snapping properties thereof were evaluated by giving the following score:
5.0: It snaps with a sharp sound.
4.5: It snaps with a thick sound.
4.0: It snaps without any sound.
3.5: It snaps with slight bending.
3.0: It snaps with bending.
2.5: It does not snap but crazes.
2.0: It bends without neither snapping or crazing.
1.5: It bends when it is merely lifted.
The results are shown in the following Tables 4 to 7.

Table 4

| Sample No. | 1 | 2 | 3 | 4 | 5 | 6 | 7 | 8 | 9 |
|---|---|---|---|---|---|---|---|---|---|
| SP (°C.) | 28.1 | 28.6 | 30.0 | 30.9 | 31.6 | 32.5 | 31.9 | 32.4 | 32.8 |
| CP (34° C.) | — | — | — | — | — | — | ∓ | ± | + |

Table 5

PMF : SNF = 65 : 35 (SOS content in SNF is 72%)

| Sample No. | 1 | 2 | 3 | 4 | 5 | 6 | 7 | 8 | 9 |
|---|---|---|---|---|---|---|---|---|---|
| Increase of viscosity (kg cm) | 0.5 | 0.5 | 0.5 | 0.5 | 0.6 | 0.6 | 1.1 | 1.3 | 1.5 |
| Snapping properties at 20° C. | 4.0 | 4.5 | 4.5 | 5.0 | 5.0 | 5.0 | 5.0 | 5.0 | 5.0 |
| Snapping properties at 28° C. | 1.5 | 2.0 | 2.5 | 2.5 | 2.5 | 2.5 | 3.0 | 3.0 | 3.0 |
| Evaluation* | B | B | A | A | A | A | B | B | B |

[Note]:
A: acceptable;
B: unacceptable

Table 6

PMF : SNF ≈ 50 : 50 (SOS content in SNF is 60%)

| Sample No. | 1 | 2 | 3 | 4 | 5 | 6 | 7 | 8 | 9 |
|---|---|---|---|---|---|---|---|---|---|
| Increase of viscosity (kg cm) | 0.5 | 0.5 | 0.5 | 0.6 | 0.6 | 0.6 | 1.0 | 1.1 | 1.2 |
| Snapping properties at 20° C. | 4.5 | 5.0 | 5.0 | 5.0 | 5.0 | 5.0 | 5.0 | 5.0 | 5.0 |
| Snapping properties at 29° C. | 2.0 | 2.0 | 2.5 | 2.5 | 2.5 | 2.5 | 2.5 | 3.0 | 3.0 |
| Evaluation | B | B | A | A | A | A | B | B | B |

Table 7

PMF : SNF = 40 : 60 (SOS content in SNF is 58%)

| Sample No. | 1 | 2 | 3 | 4 | 5 | 6 | 7 | 8 | 9 |
|---|---|---|---|---|---|---|---|---|---|
| Increase of viscosity (kg cm) | 0.5 | 0.5 | 0.5 | 0.6 | 0.6 | 0.6 | 1.2 | 1.3 | 1.4 |
| Snapping properties at 20° C. | 4.5 | 5.0 | 5.0 | 5.0 | 5.0 | 5.0 | 5.0 | 5.0 | 5.0 |
| Snapping properties at 30° C. | 2.0 | 2.0 | 2.5 | 2.5 | 2.5 | 2.5 | 2.5 | 3.0 | 3.0 |
| Evaluation | B | B | A | A | A | A | B | B | B |

The following conclusions are obtained from the above investigation.

(a) Snapping properties at high temperature of a chocolate prepared by using a hard butter composition containing PMF having SP of lower than 29° C. is inferior even if a large amount of SNF is admixed with PMF.

(b) When using PMF having CP of more than 34° C., increase of the viscosity in a tempering step is remarkably high. This increase of the viscosity does not change so much even if a mixing ratio of SNF:PMF becomes higher.

(c) Snapping properties of a chocolate prepared by using a hard butter composition containing PMF having SP of 29° C. are somewhat inferior at high temperature, but, the snapping properties are improved by increase of a mixing ratio of SNF:PMF.

(d) A change of SOS content in SNF does not affect on quality of a product at SOS content of between 58% and 72%.

(e) Snapping properties are improved with increase of SP and CP but, on the other hand, the viscosity in a tempering step increases and it makes the process difficult.

As described above, we have found that by using PMF having the specified SP and CP there can be produced the desired hard butter composition comprising PMF and SNF and having superior properties such as improved working properties in a tempering step of chocolate-making and excellent snapping properties at high temperature without necessity of using a specifically purified SNF. The hard butter composition of the present invention can be admixed with cacao butter in a high mixing ratio.

What is claimed is:

1. A hard butter composition comprising as the principal ingredients thereof an intermediate fraction of palm oil and a solid fat fraction of shea fat, said shea fat fraction containing less than 80% by weight of 2-oleo-1, 3-distearin and 2-oleo-palmito-stearin and said intermediate fraction of palm oil having a slip melting point of 29.0°–32.5° C. and a clear point of not more than 34° C., the ratio of the solid fat fraction of shea fat to the intermediate fraction of palm oil being 25 to 75:75 to 25 parts by weight.

2. The hard butter composition of claim 1 admixed with cacao butter in a ratio of cacao butter to hard butter of 70 to 30:30 to 70 parts by weight.

3. The hard butter composition according to claim 1, wherein the ratio of said intermediate fraction of palm oil to said solid fat fraction of shea fat is in a range of 30:70 to 70:30 parts by weight.

* * * * *